Figure 1:
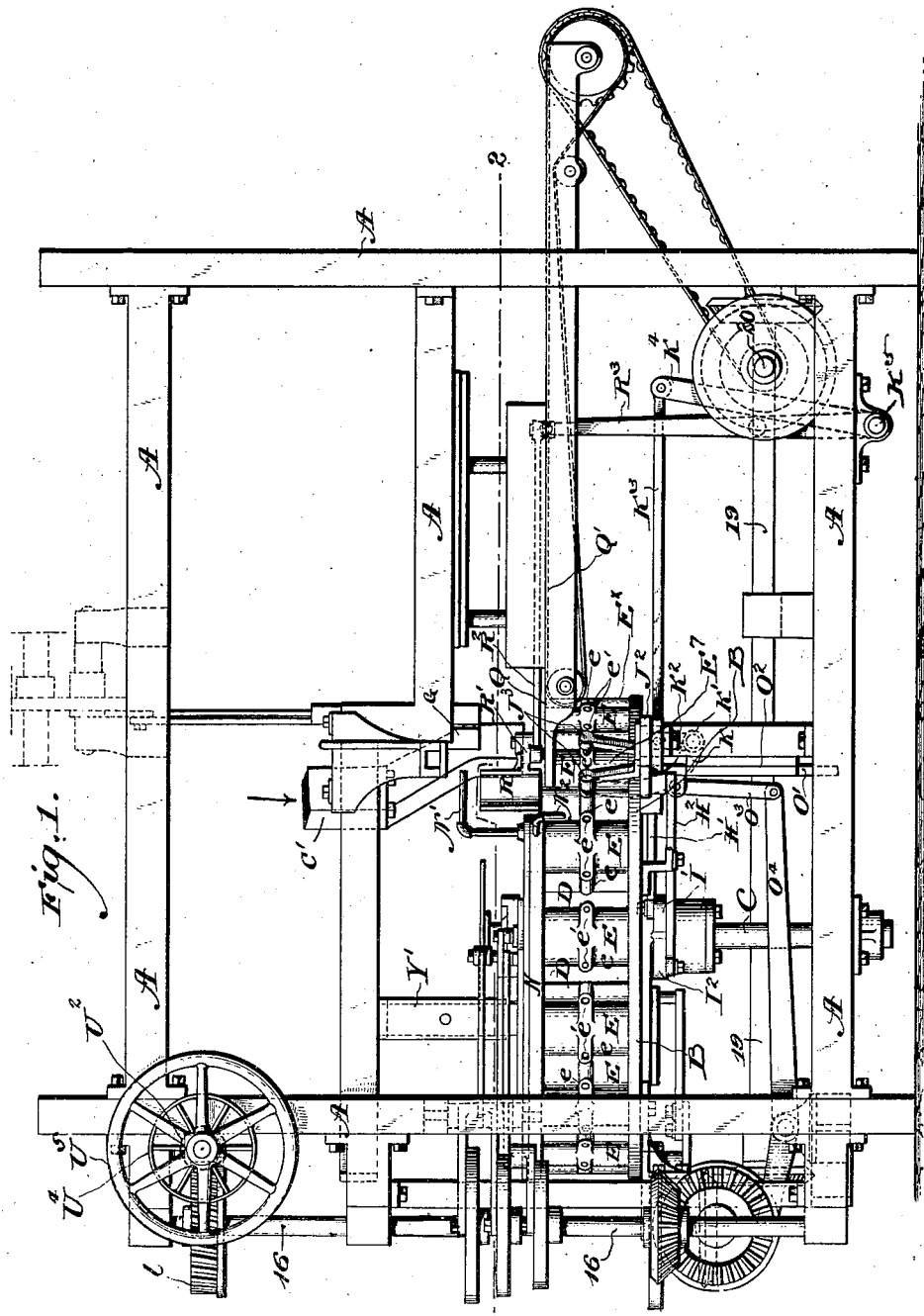

(No Model.)

10 Sheets—Sheet 1.

H. E. SMYSER.
PACKAGE MAKING AND FILLING MACHINE.

No. 505,888.

Patented Oct. 3, 1893.

WITNESSES:

INVENTOR:

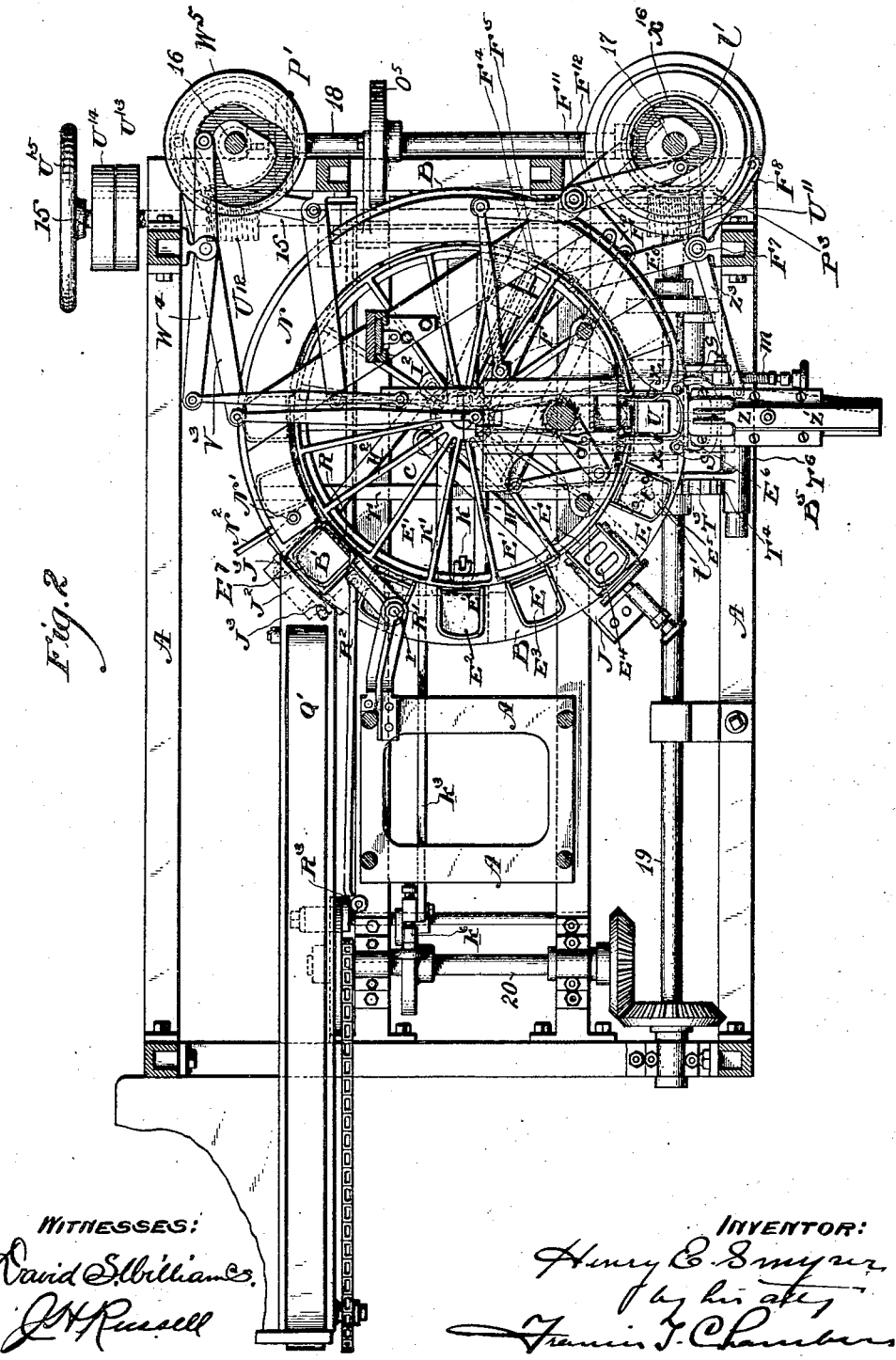

(No Model.)　　　　　　　　　　　　　　10 Sheets—Sheet 3.
H. E. SMYSER.
PACKAGE MAKING AND FILLING MACHINE.
No. 505,888.　　　　　　　　Patented Oct. 3, 1893.
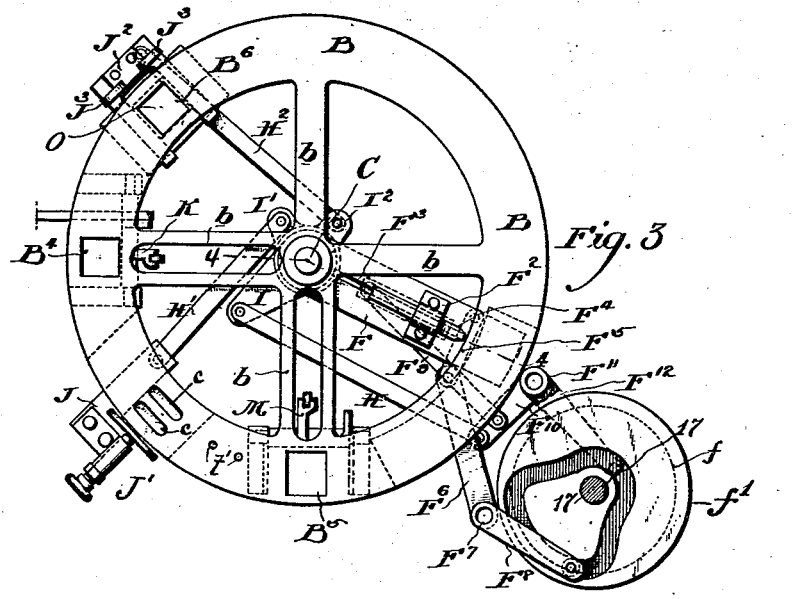
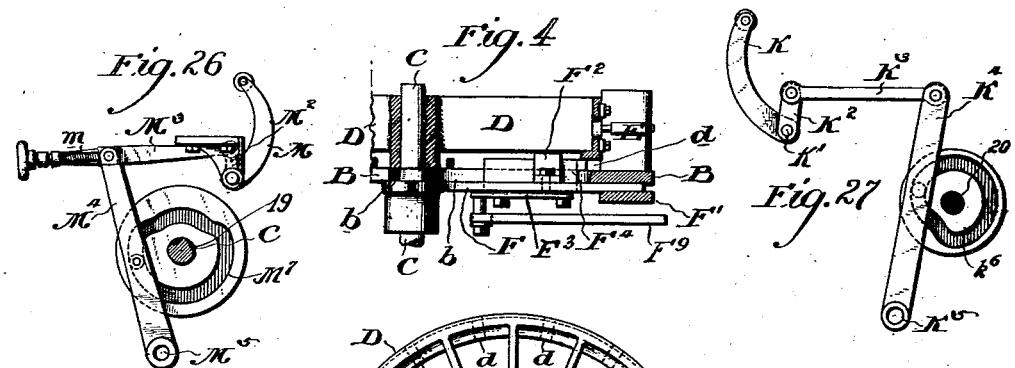
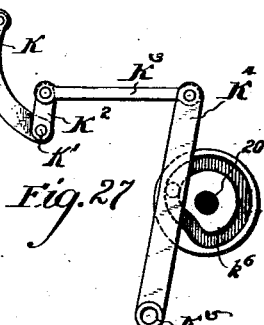
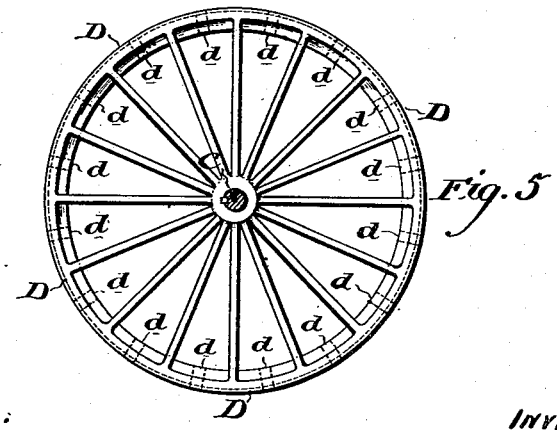
WITNESSES:　　　　　　　　　　　INVENTOR:
David S. Williams.　　　　　　　Henry E. Smyser
J. H. Russell　　　　　　　　　　by his atty
　　　　　　　　　　　　　　　　Francis T. Chambers (No Model.) 10 Sheets—Sheet 4.
H. E. SMYSER.
PACKAGE MAKING AND FILLING MACHINE.
No. 505,888. Patented Oct. 3, 1893.
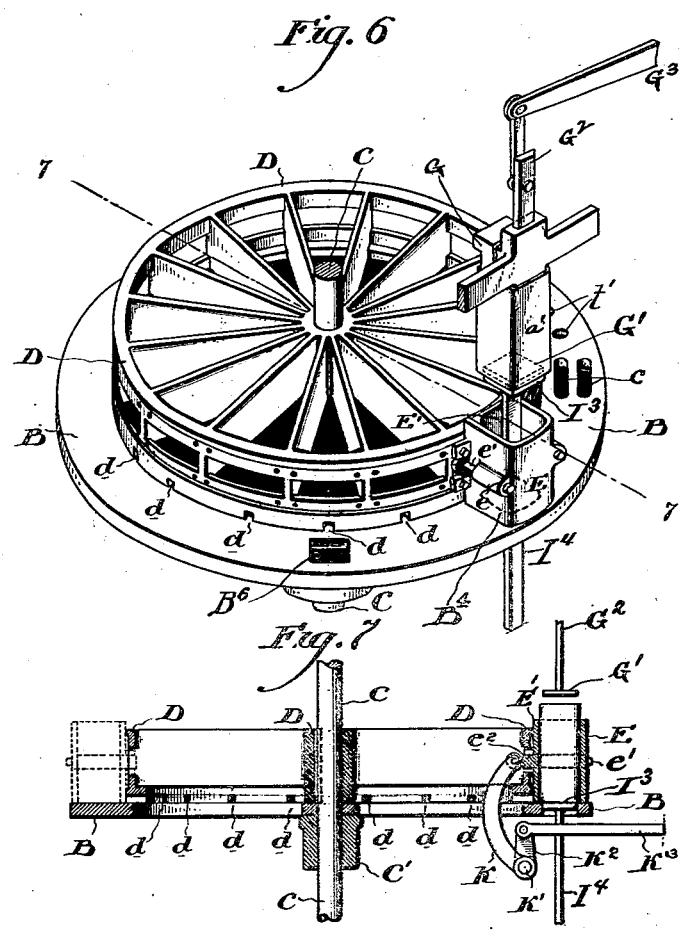
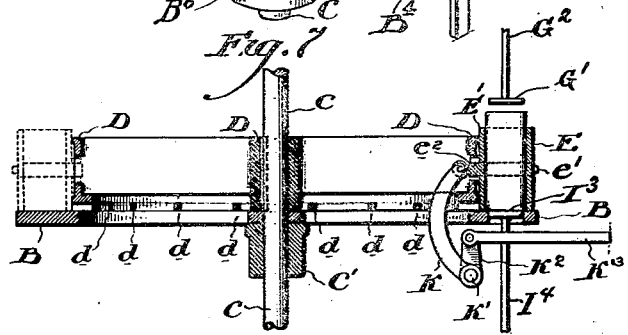
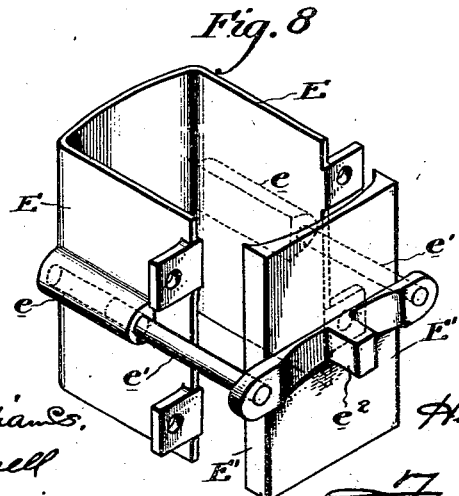
WITNESSES: INVENTOR:

(No Model.) 10 Sheets—Sheet 5.

H. E. SMYSER.
PACKAGE MAKING AND FILLING MACHINE.

No. 505,888. Patented Oct. 3, 1893.

WITNESSES:
David S. Williams.
J. H. Russell.

INVENTOR:
Henry E. Smyser
by his atty,
Francis T. Chambers (No Model.) 10 Sheets—Sheet 6.
H. E. SMYSER.
PACKAGE MAKING AND FILLING MACHINE.
No. 505,888. Patented Oct. 3, 1893.
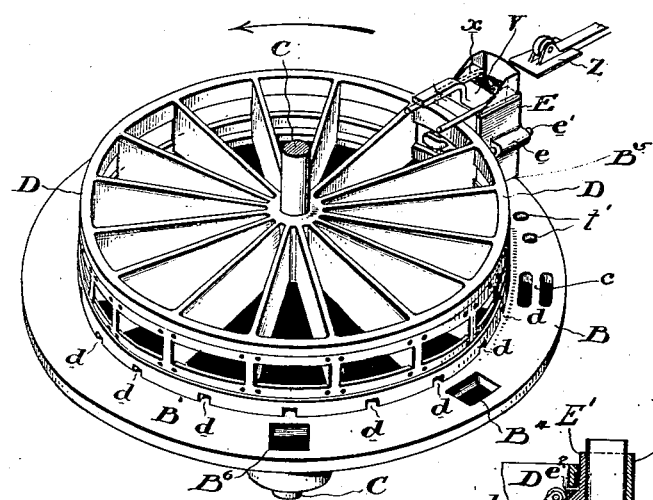
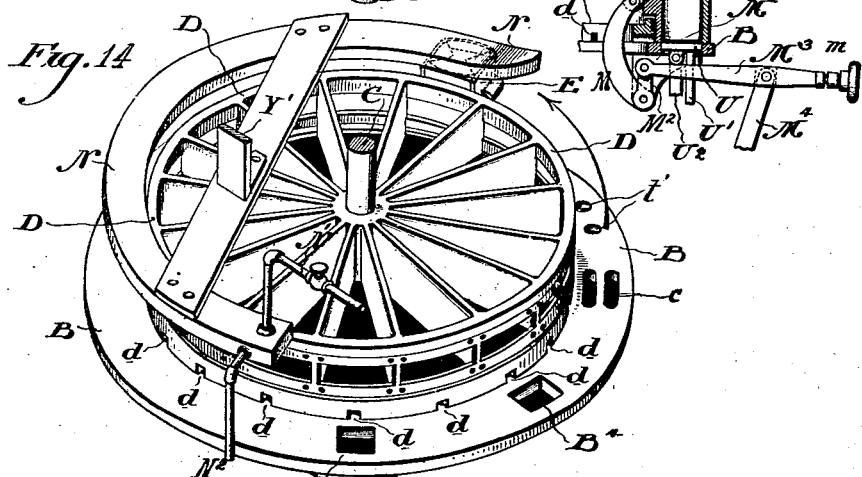
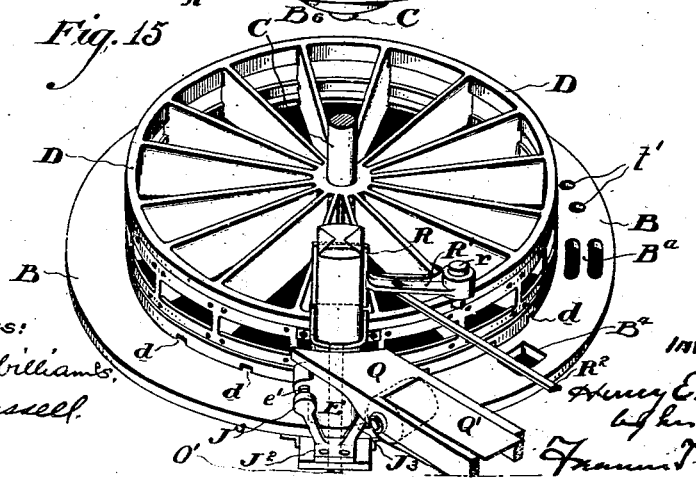

(No Model.) 10 Sheets—Sheet 7.

H. E. SMYSER.
PACKAGE MAKING AND FILLING MACHINE.

No. 505,888. Patented Oct. 3, 1893.

WITNESSES:
David F. Williams,
J. H. Russell

INVENTOR:
Henry E. Smyser
by his atty.
Francis T. Chambers

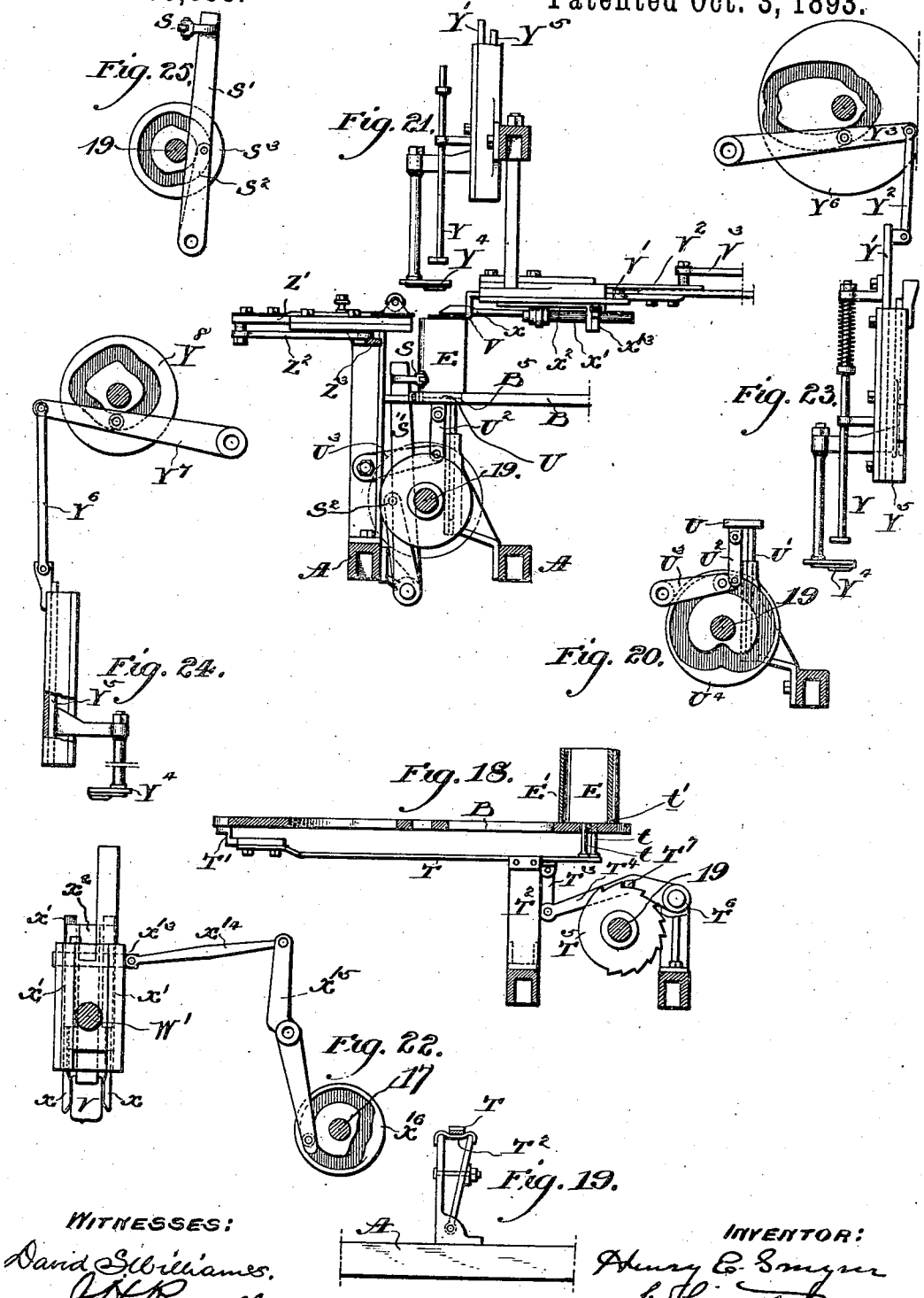

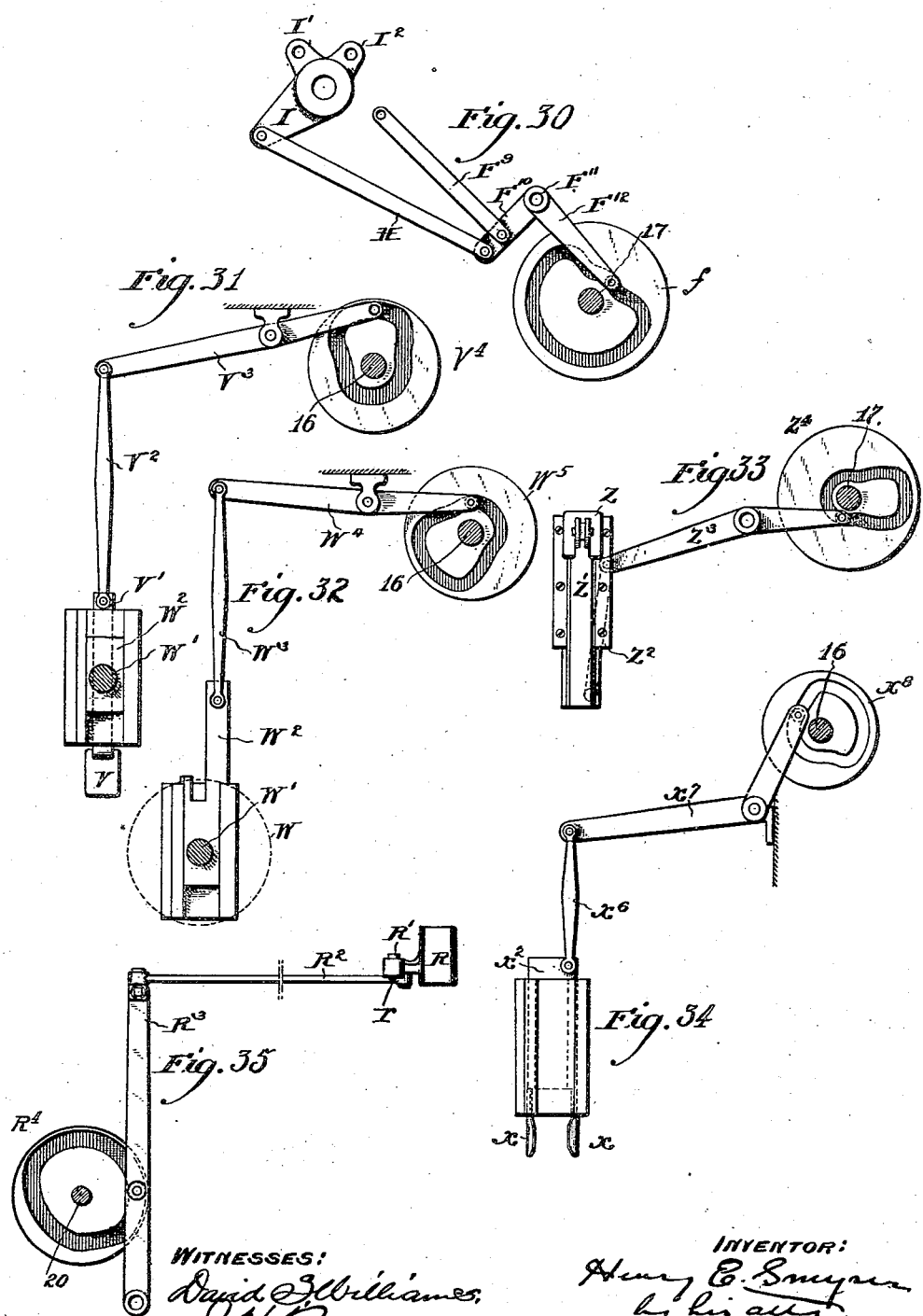

(No Model.) 10 Sheets—Sheet 10.
H. E. SMYSER.
PACKAGE MAKING AND FILLING MACHINE.
No. 505,888. Patented Oct. 3, 1893.
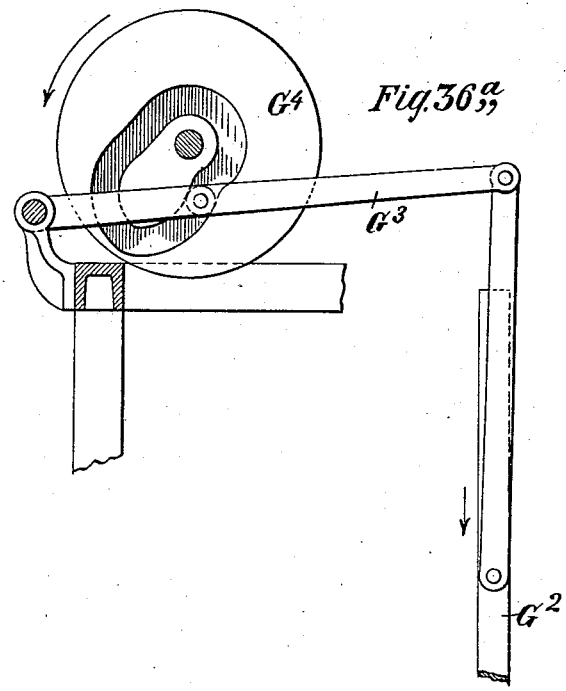
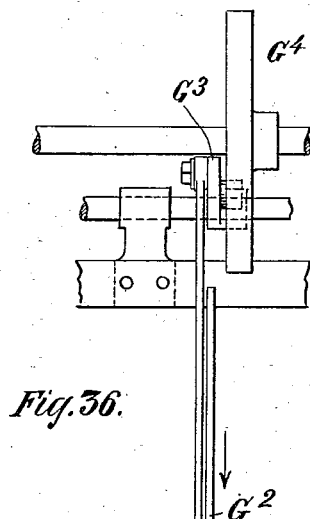
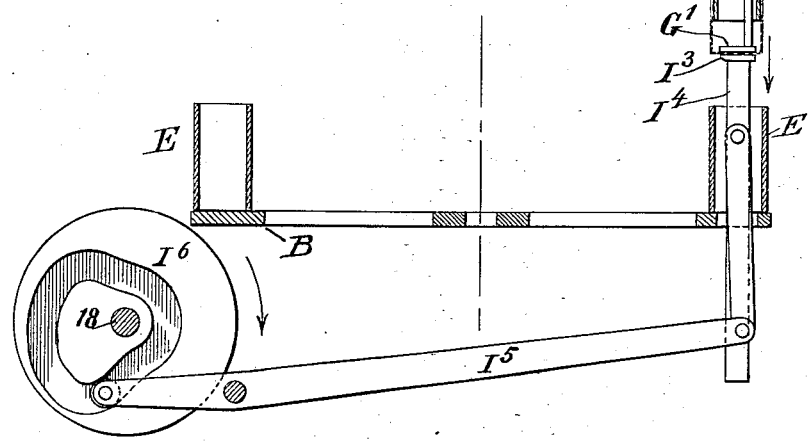
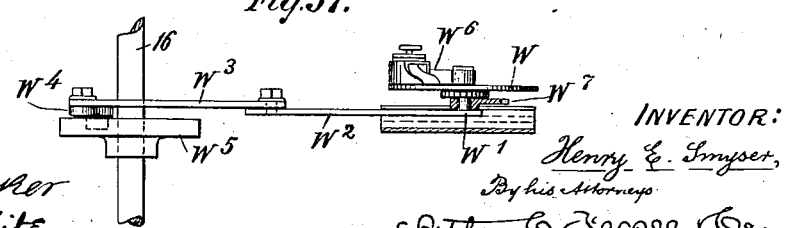
WITNESSES:
John Becker
Fred White
INVENTOR:
Henry E. Smyser,
By his Attorneys
Arthur C. Fraser & Co.

UNITED STATES PATENT OFFICE.

HENRY E. SMYSER, OF PHILADELPHIA, PENNSYLVANIA, ASSIGNOR TO ARBUCKLE BROTHERS, OF NEW YORK, N. Y.

PACKAGE MAKING AND FILLING MACHINE.

SPECIFICATION forming part of Letters Patent No. 506,888, dated October 3, 1893.

Application filed February 29, 1892. Serial No. 423,140. (No model.)

*To all whom it may concern:*

Be it known that I, HENRY E. SMYSER, of the city and county of Philadelphia, State of Pennsylvania, have invented certain new and useful Improvements in Package Making and Filling Machines, of which the following is a true and exact description.

My invention relates to packaging machines adapted to fill an open-mouthed bag or box with material, to fold down and seal the top or mouth of the bag, to dry the package, and to feed it out of the machine.

My present invention consists of certain improvements in machines of the character described and claimed in my Patent No. 449,275, dated March 31, 1891.

My present invention pertains to the mechanism for receiving and filling the bags, and for closing, transporting and delivering the packages, and has for its object to improve the parts of the machine performing these functions so as to secure a better handling of the packages during the various operations performed upon them.

The machine illustrated in my said patent includes generally three mechanisms, of which the first weighs out the material to be packaged into charges of uniform weights; the second mechanism constitutes a bag machine which takes sheets of paper from a pile, applies paste to them, folds them into a tube around a former, closes and seals the bottom, and feeds the completed bag thus made off from the former; while the third mechanism is essentially a packaging machine which receives the completed bag from the bag-making mechanism, fills it with the weighed out charges of material, shakes down or compacts the material, folds down and seals the mouth or top of the bag to make a closed package, dries the package, and finally delivers it out of the machine.

Figure 9:
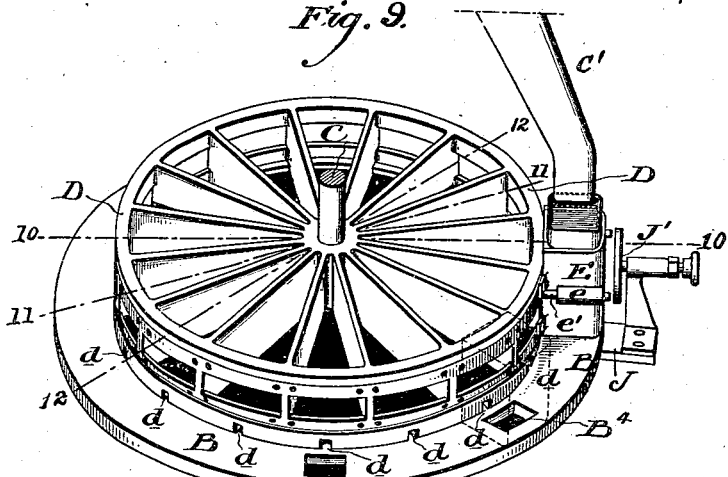
Figure 10:
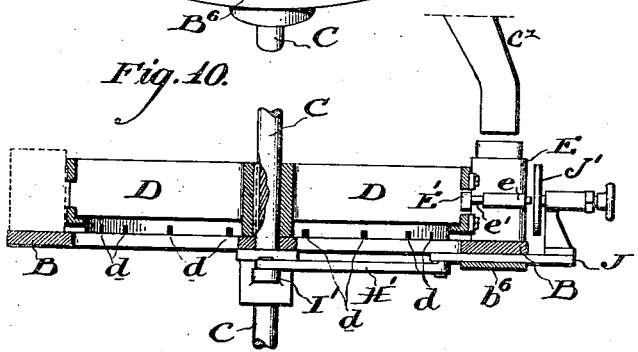
Figure 11:
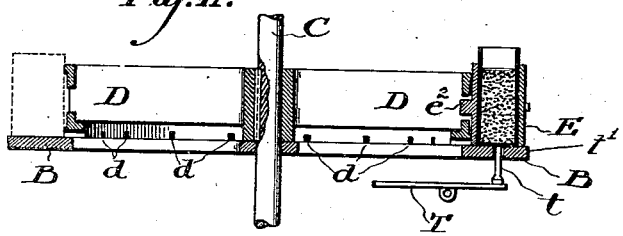
Figure 12:
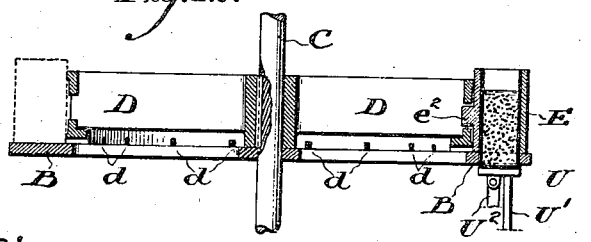
Figure 29:
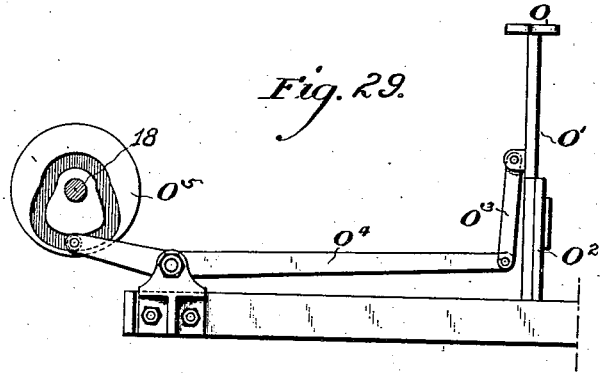
Figure 16:
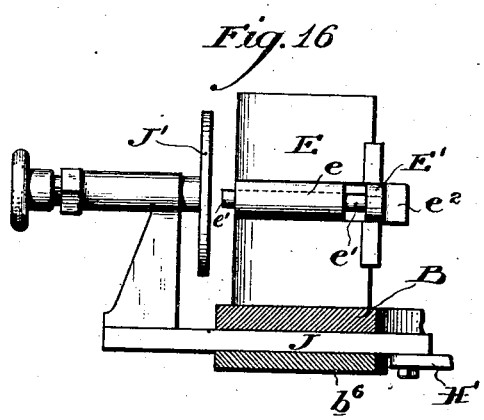
Figure 17:
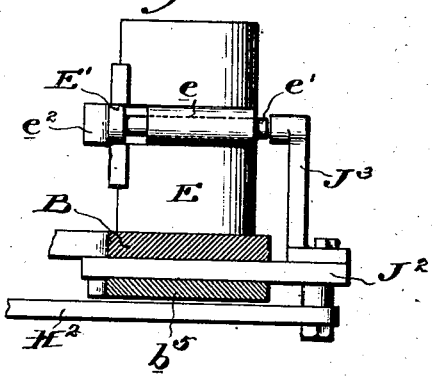

In the accompanying drawings, Figure 1 is a side elevation of the portions of a packing machine to which my improvements relate. Fig. 2 is a sectional plan view of the same portions of the machine on the line 2—2 in Fig. 1. Fig. 3 is a plan view exhibiting the table over which the packages are moved and the mechanism for moving the pockets which carry the packages and for opening and closing the movable sides of these pockets. Fig. 4 is a cross-sectional view taken on the line 4—4 of Fig. 3, showing also the wheel which carries the boxes and one of the boxes attached thereto. Fig. 5 is a plan view of the pocket carriage or carrying wheel. Fig. 6 is a perspective view showing the table, the pocket carriage, one of the pockets, and in connection therewith the mechanism for delivering the empty packages to the pockets. Fig. 7 is a cross-sectional view on the line 7—7 of Fig. 6. Fig. 8 is a perspective view of one of the package-carrying pockets. Fig. 9 is a perspective view of the table, carriage, one of the pockets, the filling spout, and the device used for pushing open or inward the movable side of the pockets. Fig. 10 is a cross-sectional view on the line 10—10 of Fig. 9; Fig. 11 a cross-sectional view on the line 11—11 of Fig. 9, the section being taken through the shaking device; Fig. 12 a cross-sectional view on the line 12—12 of Fig. 9, the section being taken through that part of the table on which the bag is situated when the top of the package is closed. Fig. 13 is a perspective view of the table-carriage, and one attached pocket, the package being shown at the point where its top is closed together with some of the mechanism for effecting this closing. Fig. 14 is a perspective view exhibiting the drying device under which the packages pass after their tops are closed and before they are delivered from the machine; Fig. 15 a perspective view exhibiting the package in the act of being lifted from the pocket. Fig. 16 is a sectional elevation exhibiting the device for pushing open the movable side of the pocket at the point where the package is filled; Fig. 17 a similar elevation exhibiting the device for pushing open the side of the pocket at the point where the package is delivered; Fig. 18 a sectional elevation exhibiting the shaking device; Fig. 19 a front view of a part of the shaking mechanism shown in Fig. 18 in side elevation. Fig. 20 is a view of the mechanism for lowering and raising the package at the point where the package is closed; Fig. 21 an elevation of the various devices operating at the point where the package is closed. Figs. 22, 23 and 24 are detail views of the mechanism employed for closing the package; Fig. 25 an elevation of the centering device employed for insuring the proper alignment of the package when its top is closed down. Fig. 26 (Sheet 3) is an elevation of the device used for closing the movable side of the pocket at the point where the top of the package is closed down. This is also illustrated in Fig. 28; Fig. 27 an elevation of the device for closing the movable side of the pocket at the point where the package is deliverd to it; also shown in Fig. 7. Fig. 29 is an elevation of the plunger which lifts the package from the pocket, with the mechanism and cam which actuate it. Fig. 30 is a plan view of part of the mechanism shown in Fig. 3; Fig. 31 a plan view of one of the slides used in closing the top of the package with its actuating cam; Figs. 32, 33 and 34 similar views of other slides and folders used in closing the top of the package, together with the cams which actuate them; and Fig. 35 is a side elevation of the device for pushing the packages on to the belt which carries them away from the table, with the cam which actuates it. Fig. 36 is a side elevation of the two plungers which carry the bags from the former into the pockets, with their operating mechanism, the former and pocket being shown in section. Fig. 36ᵃ is a view at right angles showing the cam for operating the upper plunger. Fig. 37 is a sectional side elevation of the top pasting mechanism shown in Fig. 32.

Referring to the drawings, let A designate in general the frame of the machine, B a stationary horizontal table which is shown as of annular form concentric with a vertical shaft C, and having radial arms or spokes $b\,b$ (Fig. 3) and formed with openings $B^4$, $B^5$ and $B^6$ in the positions shown in Fig. 3.

D is a wheel or circular carriage which is fixed on the shaft C so as to be turned therewith.

E E are a series of pockets or boxes for holding the bags or packages. These pockets are screwed or otherwise fastened to the outside of the rim of the wheel or carrier D, being equidistantly arranged around it. The pockets are so constructed that they can be expanded or contracted, preferably in the manner shown in Fig. 8, by forming the rear side $E'$ of the pocket as a movable back wall, it being formed with a cross-bar $e^2$ having parallel rods $e'\,e'$ extending on opposite sides of the pocket and sliding in holes formed in bearing lugs $e\,e$. When the movable back or side $E'$ is pushed in, the pins $e'$ project out in front of the pocket, and mechanism is provided to press against these pins to expand the pocket, as will be presently described. A driving mechanism is provided for intermittently rotating the shaft C and pocket-carrying wheel D, the extent of rotative movement being equal to the distance from one pocket to the next.

I will now describe the operation in general. Assuming first that a paper bag has been formed around a vertical former G (Fig. 1) by means of the bag forming mechanism (not shown), this bag having a closed bottom, the bag is first removed from its position around the former, as shown at $a'$ in Fig. 6, and carried down into one of the pockets E standing directly beneath the former. This operation is accomplished by two vertically-moving plungers $G'$ and $I^3$ (Figs. 6, 7 and 36). The plunger $I^3$ ascends from its normal position in the opening $B^4$ in the table B, rising through the pocket E until it presses against the bottom of the bag, while the plunger $G'$ which rests at the bottom of the hollow former G holds the bag against the plunger $I^3$, and both plungers then move down together until the bag is carried into the pocket E, whereupon the plunger $G'$ ascends to above the level of the bag, as shown in Fig. 7. Fig. 36 shows the plunger moving down. The plunger $G'$ is mounted on a vertically-moving slide $G^2$ moved up and down by a lever $G^3$ (Fig. 36) which is driven by a cam, $G^4$ (Fig. 36ᵃ) as shown in my said patent. The plunger $I^3$ is mounted on a vertical slide $I^4$, connected by a link to a lever $I^5$ which is vibrated by a cam $I^6$, (Fig. 36) to move the plunger up and down, as shown in my said patent. The empty bag having thus been carried into the pocket, the series of pockets executes a partial rotation, whereby this pocket is moved forward one space, or from the position $E^2$ in Fig. 2 to the position $E^3$. At the next movement the pocket is carried to the position $E^4$, where it stands underneath a feed spout $C'$ leading down from the weighing apparatus hereinbefore referred to, or from any other source of supply of the material to be filled into the packages. The pocket is shown in this position in Figs. 9 and 10. The pocket here stands over two holes or slots $c\,c$ (Figs. 3 and 6) in the table B. The supply of the material is here dumped down through the chute $C'$ into the bag. If by chance a bag should have been omitted, or its bottom should not have been properly sealed, the material thus introduced will fall through the slots $c\,c$ and be carried away. At the next intermittent movement of the pockets, the pocket in question reaches the position $E^5$ in Fig. 2, the pocket being shown in this position in Figs. 11 and 18. Here the bag is repeatedly lifted and dropped in order to shake down and compact its contents. The bag stands over openings $t'$ in the table B (see Figs. 3, 6 and 13), and pins $t$ which extend through these openings are caused to move rapidly up and down, at each upward movement lifting the bag, and then descending and permitting it to fall to the bottom of the pocket. The mechanism for operating these pins is shown in Fig. 18, and consists of an elastic spring or bar $T'$ fastened at $T^2$ and connected by a link $T^3$ to a lever $T^4$ pivoted at $T^6$ having a pin $T^7$ acted on by the teeth of a wheel or cam $T^5$ fixed on the revolving shaft 19. Each time a tooth lifts the pin T⁷ the spring T is lifted, and upon the escape of the tooth it flies downward, striking on an adjustable rest or abutment T² (Fig. 19). At the next intermittent movement of the pockets the pocket whose movements we are following reaches the position E⁶ in Fig. 2, being shown in this position in Figs. 12, 13 and 21. In this position the mouth of the bag is closed and sealed. In this position the package rests upon a plate or plunger U normally lying flush with the top of table B in the opening B⁵ (Fig. 3). This plunger is mounted on a rod U' (Fig. 20) moving in suitable vertical guides, and is actuated by a cam U⁴ on the shaft 19 acting upon the lever U³ which is connected with the plunger by means of a link U². As the package comes to rest upon the plunger, the latter is drawn down, lowering the package with it, and then moved up again, and during its upward motion the devices for folding and pasting the top come into play. The top is closed by a folder V, (Figs. 13, 21, 22 and 31) which makes the first side fold, by two wing folders $x$ $x$ (Figs. 13, 21, 22 and 23), which fold the end flaps, and by a folding plate Z (Figs. 13, 21 and 33) moving from the opposite side. The bag having been lowered by the plunger U, and while it is being lifted thereby, is first acted upon by the folding plate V which advances and lays down the inner side of the paper bag, completing its motion just before the plunger U has risen to its full height at the level of the table B. The wing folders $x$ $x$ advance with the plate V, following close after it, being at this time turned inward as shown in Fig. 22, so as not to project against the paper as it is being folded in and down by the plate V. Immediately after the plate V has finished its movement the wing folders are fully entered, and about the time the bag has been fully raised by the plunger beneath, (or just afterward) the wing folders begin to turn outwardly; as they reach the perpendicular (see Fig. 13) they engage the projecting end flaps of paper and as they swing outwardly they fold these flaps outward, forming them into triangular wings, and draw the paper on the outer side of the bag (opposite the plate V) down on top of the contents. Simultaneously the opposite folder plate Z advances, laying down this outer fold and pressing its pasted edge against the first or inner fold, the first plate V receding ahead of the plate Z to avoid contact with the pasted edge of the outer fold. This leaves the wing folders $x$ $x$ folded into the triangular flaps or wings, the latter being turned out horizontally and held by the folders $x$ $x$ while two pasters Y Y (Fig. 21) descend and apply paste to them. A presser Y⁴ descends against a roller carried on the plate Z and presses this plate down to close together the pasted seam uniting the outer and inner side flaps, and to flatten the top of the bag on its contents. As the pasters Y Y reascend the wing folders $x$ $x$ turn inwardly, folding the triangular wings or end-flaps upwardly and inwardly. As these wings pass beyond the vertical, so as to be able of themselves to hold the outer side flap from rising, the plate Z (still pressed down by the presser Y⁴) is drawn out, and the continued inward movement of the wing folders lays the wings down close over the top of the bag. The presser Y⁴ then descends farther, and as soon as it reaches the wings so as to bear upon them and prevent their springing up, the wing folders $x$ $x$ recede, thus sliding out of the wings; the presser at the same time is still descending, and finally presses the wings firmly down upon the top of the bag, and dwells there an instant to unite the pasted seams, and flatten the top of the bag. These several operative parts are driven in the following manner:—The first folding plate V is mounted on a slide V' and is advanced and retracted by a cam V⁴ and connecting lever V³ and link V², as shown in Fig. 31. The outer folding plate Z is mounted on a slide Z' so as to be movable up and down, the slide being actuated by a cam Z⁴ connecting lever Z³ and link Z², as shown in Fig. 33. The wing folders $x$ $x$ are mounted on a slide $x^9$ and advanced and retracted by a cam $x^8$ and intervening lever $x^7$ and link $x^6$ as shown in Fig. 34. Their oscillatory movements are imparted to them by the engagement with their spindles $x'$ which constitute elongated pinions, of opposite racks on a transverse slide $x^{13}$ driven by a cam $x^{16}$ and connecting lever $x^{15}$ and link $x^{14}$ as shown in Fig. 22. The presser Y⁴ is mounted on a vertical slide Y⁵ driven by a cam Y⁸ and connecting lever Y⁷ and link Y⁶ as shown in Fig. 24. The pasters Y Y consist of vertical spring mounted rods carried by a vertically moving slide Y⁴ driven by a cam Y⁶ and connecting lever Y⁵ and link Y² as shown in Fig. 23. The pasters take paste from a disk W (Fig. 37) which is mounted on a vertical shaft W' on a slide W², (Figs. 32 and 37) this slide being reciprocated from a cam W⁵ through a connecting lever W⁴ and link W³. The disk moves forward beneath the pasters while they are elevated; the pasters then descend against the layer of paste on top of the disk, and again ascend; the disk then moves back out from under the pasters; and the latter then descend to apply paste to the triangular wings, and again ascend above the level of the disk. The disk carries a charge of paste in a stationary box W⁶ and is intermittently revolved to distribute the paste by a ratchet-and-pawl shown in Fig. 2, the ratchet being fixed to the disk and the pawl carried by an arm W⁷ pivoted on shaft W' and connected by a link W⁸ to a stationary part, so that it is vibrated by the reciprocation of the disk-carrying slide. All this mechanism is substantially the same as in my said previous patent, for which reason I do not here describe it in complete detail. At the next forward movement of the pockets the bag is carried beneath a steam heated drying table N, shown best in Fig. 14, consisting of a hollow segmental ring extended over the path of travel of the pockets, and filled with steam, by which the bags are heated and their pasted seams dried. Steam enters this chamber through a pipe N' and the steam or water of condensation leaves it through a pipe $N^2$. The package is thus dried during several successive movements of the pockets, until finally the pocket whose operation we are following passes out from under this drying chamber and reaches a position over the opening $B^6$ in the table B, which position is shown at $E^7$ in Fig. 2. The bag here rests on a plate or plunger O which stands in the opening $B^6$ (Fig. 3). This plunger, which is operated from a cam $O^5$ and intervening mechanism, as shown in Fig. 29, thereupon rises, lifting the package out of the pocket and to slightly above the top thereof, to the position shown in Fig. 15. Thereupon a pushing plate R behind the package executes a forward movement and slides the package onto the table Q, and onto an endless traveling belt Q', by which the package is carried out of the machine.

The operations and the mechanism thus far described do not differ substantially from those of the machine described in my said patent. I will now proceed to describe the improvements therein introduced by my present invention.

The purpose of making the pockets adjustable by means of the sliding back E' is to enable each pocket to be alternately contracted to grip the bag or package, and expanded to release it. In my said previous patent, each pocket in its entire revolution from the point where it receives the bag to the point where the package is expelled from it, is contracted and expanded only once. This contraction occurs in the position where the top of the bag is closed in, and it is re-expanded while the completed package is being expelled from it, in order that by its expansion it shall be in readiness to receive a new bag when it reaches the initial position again. In my former patent the back E' of the pocket was forced in and out by moving parts acting directly upon it, and its guide-pins or rods e' did not project through the bearing lugs e. By my present invention I elongate these rods e', causing them to project beyond the front or outer side of the pocket as shown in Fig. 6, and I provide a moving part to act against these protruding ends to press them back and thereby to throw back the movable wall E' of the pocket to expand the pocket. This moving part is shown as a disk in Fig. 16 at J', mounted on the slide J, or as a moving part $J^3$ in Fig. 17, mounted on a slide $J^2$, these slides being movable in proper time to cause the part J' or $J^3$ to push in the protruding ends of the pins e', and thereby push back the rear wall E' of the pocket. This wall is thereby acted upon to expand the pocket wholly from the exterior of the pocket, instead of by mechanism entering the pocket and acting directly against the inner side of the back wall, as in my former patent.

With the construction shown in my former patent, difficulty would be apt to be encountered by reason of the adherence of the bag to the upper plunger G', which might occur through the exudation of the paste from the bottom folds of the bag, so that after the bag was carried down properly into the pocket, the return or upward movement of the plunger G' might lift or carry the bag back more or less out of the pocket. To overcome this difficulty my present invention provides for the contracting of the pocket immediately upon the plunging of the bag down into it, this contraction being sufficient to cause the pocket to firmly grasp the bag and hold it during the upward movement of the plunger G'. To accomplish this I provide an arm K, preferably carrying a roller at its end and arranged within the annular table B and back of the opening $B^4$, its position being shown in Figs. 2 and 3. This arm K is mounted on an oscillatory shaft K' having an arm $K^2$ connected by a link $K^3$ to a lever $K^4$ pivoted at $K^5$, and acted on by a cam $k^6$ on the shaft 20, as shown in Fig. 27. After the plungers have carried the bag down to the bottom of the pocket, this cam causes the lever K to move toward the pocket, so that this roller acts upon the rear projection $e^2$ (Figs. 7 and 8) and pushes the back E' of the pocket so as to contract the pocket and grip the bag. The pocket remains thus contracted or collapsed until the position $E^4$ is reached, and until after the charge of material has been dumped into the bag, whereupon the pocket is expanded in order to release its grasp upon the filled bag, so that upon reaching the position $E^5$ the bag may be freely lifted and dropped within the pocket. By delaying the re-expanding of the pocket until this time, the advantage is gained that the pocket is contracted and embraces the bag at the time when the charge of material is being introduced into the bag from the chute C', so that the bag is firmly supported while the material is thus dropped into it, and is consequently not bulged outwardly or strained by the pressure of the material as it is thus rapidly or forcibly introduced into the bag. This is especially important when the bag is freshly made and the paste uniting its seams has not yet dried or set. In such case, if the bag were merely loosely contained in the pocket, it might be so distended by the pressure of the material entering it as to partly open its seams.

The means for expanding the pocket to release the bag before shaking it down is shown in Figs. 3 and 16. It consists of a disk or other shaped part J' mounted on a slide J moving under the table B and guided by a plate $b^6$, the slide being moved out and in at the proper instant by means of a link H' pivoted to an arm I' of a three-arm lever I, which is oscillated back and forth as hereinafter explained. While the pocket is standing in the position $E^4$ over the openings $c\ c$, and after the bag has been filled the disk or pusher J' moves toward it, encounters the protruding ends of its pins $e'$, and pushing them in pushes back the movable back section E', thereby expanding the pocket and releasing the package so that it may be freely lifted and dropped. When the pocket reaches the position $E^6$ in which the top of the bag is folded down, it comes opposite a lever arm M (Figs. 3 and 28). As soon as the plunger U after having descended has moved up to its normal position again the lever M commences to move toward the pocket, and its end, which is preferably provided with a roller, engages a projection $e^2$ on the rear of the movable back E' of the pocket and forces it in so as to contract the pocket and compress the package, holding it firmly therein during the operations of folding down the top. The importance of having the package tightly held during the completion of the closing and pasting down of its top will be readily understood. The arm M is actuated by a cam $M^7$ (Fig. 26) which vibrates a lever $M^4$ pivoted at $M^5$ and acting through a link $M^3$ on a short arm $M^2$ connected with the lever-arm M. This mechanism is somewhat different from that shown in Fig. 42 of my said previous patent. According to my previous construction no means is provided for graduating the extent to which the pocket should be closed upon the package. Inasmuch as it is occasionally necessary to vary the size of the package in order to accommodate it to material which is more or less bulky in relation to its weight, or for other reasons, it is highly desirable that the operator shall be able to regulate at will the extent to which the pocket is contracted upon the package. To this end I interpose a screw adjustment $m$ (Fig. 26) the screw being so arranged as to be within reach of the attendant for adjustment. In the construction shown the screw $m$ is interposed so as to vary the point of connection between the lever $M^4$ and the link $M^3$. The lever $M^4$ is jointed to a sliding block movable longitudinally of the link and constituting a nut engaged by the screw $m$, which is rotatively pivoted in a bearing carried by the end of the link and engaging the screw in such manner that it cannot move longitudinally relatively to the link. After the pocket has been closed upon the package, its movable back retains its position frictionally after the advance of the pocket beyond the lever M, and continues to hold the package and maintain it in proper shape during the drying operation. In my former patent the pocket after being contracted upon the package during the closing of the top thereof, was not again expanded until the package was being lifted out of the pocket. When the plunger O started to lift the package out, the pocket was still contracted upon the package and continued so contracted until the package had been nearly lifted out of the pocket, whereupon an elbow-lever entering the pocket acted to expand it. The expansion of the pocket consequently did not serve to facilitate the operation of delivering out the package, but merely served to prepare the pocket for receiving the next empty bag that should be plunged down into it. According to my present invention I provide for expanding the pocket before the operation of expelling the completed package is commenced, in order that the package may be lifted out freely and without its expulsion being resisted by the frictional cling of the pocket. This expanding of the pocket is performed by the pusher $J^3$, shown in Figs. 3 and 17. This pusher is mounted on a slide $J^2$ moving beneath the table B and guided by a plate or guideway $b^5$. The slide is connected by a link $H^2$ to an arm $I^2$ of the oscillatory lever I before referred to, which is driven as hereinafter explained. This lever I executes its oscillation in a direction to draw in the pushers J' and $J^3$ against the pockets shortly after the intermittent forward movement of the pockets, so that after the pockets have come to rest in their new positions they are expanded by the pushers $J^3$ and J'. This expansion of the pocket occurs before the plunger O commences to ascend in order to lift out the package. In my former patent, the package having been lifted above the top of the pocket by the plunger, was pushed off by a reciprocating slide. In my present construction it is pushed off by a plate or sweep R mounted on an arm R' and having a vibratory motion around a stud $r$ on which this arm is pivoted (Figs. 2 and 15) the arm being vibrated by a cam $R^4$ (Fig. 35) on the shaft 20 acting on a lever $R^3$ which is connected through a link $R^2$ with the lever-arm R'. The pushing plate R consequently has a sweeping motion which thrusts the package in the arc of a circle, turning it partly around and directing it properly onto the delivery belt Q'. Subsequently the plunger O descends before the next advance of the pockets.

My present invention provides an improved means for imparting the intermittent advancing movements to the pockets. According to my previous patent the pockets were carried inside a ring which on its exterior was formed with ratchet teeth or notches engaged by a pawl on a vibrating arm. My present invention provides an improved construction for carrying the pockets, and a more positive motion for advancing them and for locking them fast during their periods of rest. The pockets are fastened to the exterior of a ring or wheel D, shown detached in Fig. 5, the rim of which is connected by spokes to a central hub fixed on the shaft C. In the lower edge of the rim of wheel D, or otherwise conveniently located, are formed notches $d\ d$ arranged equidistantly and equal in number to the pockets. These notches are engaged successively by the outer end of a bolt F⁴ (Figs. 3 and 4) which is movable in suitable longitudinal guides on a lever F which is journaled on the shaft C, and supported at its outer end in a stirrup or plate F' fastened beneath the table B. In the construction shown the bolt is formed as an upward projection from a slide F³ working through a slot in the lever and guided by a saddle F². The bolt is moved toward and from the center of the shaft C by the action of a cam $f$, shown best in Fig. 30, fixed on the shaft 16 and vibrating the arm F¹² of an elbow-lever pivoted at F¹¹, and the other arm F¹⁰ of which is connected by a link F⁹ to the bolt. Upon this same shaft is also secured another cam $f'$ (Fig. 3) which acts upon one arm of the bell-crank-lever F⁸ F⁶ pivoted at F⁷ and connected by a link F⁵, shown in dotted lines in Fig. 3, to the lever F, so as to vibrate this lever at intervals the distance from one bolt-hole or notch $d$ to the next. The action of these parts can be readily followed:—The bolt F⁴ is first protruded so as to enter a notch $d$, after which by the action of the cam $f'$ the lever F is swung forward so that the bolt carries with it the wheel D and the series of pockets the distance from one pocket to the next; subsequently the bolt is drawn back to clear the notches $d$, and the lever F is returned to its starting point, after which the bolt F⁴ is again protruded and after the proper interval of time the operation is repeated. The bolt after pushing forward the wheel D comes to a stop and thereby stops the wheel and pockets before the bolt is retracted, to disengage it from the notch $d$, thereby insuring the stoppage of the pockets in the correct position.

In the drawings, I have shown the device for opening the pockets as actuated also from the cam $f$, and through the bell-crank-lever F¹³ F¹⁰. A link H jointed to the arm F¹⁰ of this lever connects to the oscillating lever I before described, having the arms I' and I² which are connected by links to the slides of the pushers J' and J² before described. As before stated, the pockets are expanded immediately after the forward movement of the pockets, and as soon as they have come to rest, and this is very conveniently performed at the same time that the bolt F⁴ is operated to retract it from the notch, so that the bolt and pocket-expanding pushers are very simply operated from the same cam.

I have found that it is highly important to provide a device that will act with certainty and precision to hold the several pockets in their proper positions during the several operations, and especially during the closing of the top of the package. For this purpose I provide a steady pin, catch or clutch which will engage and hold the pockets or their carrying wheel during the time when the bolt F⁴ is retracted and disengaged from the wheel. Such a device is shown in Figs. 2, 21 and 25.

It consists in the construction shown of two arms or fingers S, preferably carrying rollers on their ends, adapted to grip the pocket at opposite sides, and moved in or out at proper times by means of a cam S³ (Fig. 25) acting on an arm S² of a lever S' which carries the arms S. The shape of the cam is such as to throw the arms into engagement with the pocket when the bolt F⁴ is retracted, and to hold the arms in engagement therewith until the folding of the top of the package is completed and the bolt has again engaged the carrying wheel D ready for another forward feed, at which instant the arms S are drawn back to let the pocket move freely past.

In the construction shown the machine is driven by power applied to the shaft 15 through fast and loose pulleys U¹³ U¹⁴. This shaft carries worms U¹² meshing with worm wheels $l$ $l'$ on two vertical shafts 16 and 17. The shaft 16 carries the cams V⁴ W⁵ and $x^8$ for operating the bag-closing mechanism. The shaft 17 carries the cams Z⁴ and $x^{10}$ of the bag closing mechanism, and the cams $f f'$ of the mechanism for advancing the pockets. A horizontal shaft 18 is driven by bevel-gears from the shaft 16 and carries the cam O⁵ for working the plunger O. A horizontal shaft 19 is driven by bevel-gearing from the shaft 17, and in turn drives another horizontal shaft 20. The shaft 19 carries the cams M⁷ for working the pocket-opening arm M, the toothed wheel or cam T⁵ for working the shaker, and the cam U⁴ for working the plunger U. The shaft 20 carries the cam $k^6$ for operating the pocket-opening arm K.

It must not be inferred from the detailed description which I have given of the preferred construction of my machine that my invention is necessarily limited to the exact details of construction shown.

Many of the features of my machine are susceptible of considerable modification in structural respects without departing from the essential features of my invention. For example, the described construction of the pocket to enable it to be expanded and contracted is not essential, as any construction of pocket which will admit of being contracted to grip the bag and expanded to release it might be substituted.

The mechanism for expanding and contracting the pockets might be considerably varied, it being only essential to these mechanisms that they shall engage the pockets in such manner as to cause them to expand or contract to the requisite extent and at the proper times. In the case of a pocket constructed with the movable back or wall E', this wall might be otherwise mounted than by the rods $e'$, or if such a mounting be employed a single rod might suffice in place of the two rods shown, although the construction illustrated is preferred.

As a means for centering and holding the pockets in proper position during their periods of rest, some other mechanism than the arms S S for embracing the pockets might be employed, any mechanism for securely locking the pockets in position being admissible that shall correctly center the pockets or bring them into proper register with the operating mechanism.

As the agitating device for shaking down the contents of the bag forms no part of my present invention, it might be substituted by any other mechanism for agitating or shaking down the contents.

I claim as my invention the following-defined novel features or improvements, substantially as hereinbefore specified, namely:

1. In a package filling machine, the combination of a pocket constructed to be expanded and contracted, a plunger for forcing a bag into the pocket, and mechanism for contracting the pocket to grasp the bag and prevent its displacement by the withdrawal of the plunger.

2. In a package filling machine the combination with a former having a bottom plunger adapted to move downwardly, a plunger beneath adapted to move up to meet it and grasp between them the bottom of a bag on said former, and driving mechanism for moving said plungers down together to carry down a bag from said former, of a series of pockets constructed to be expanded and contracted, driving mechanism for moving them successively under said former, to receive the bags carried down by said plungers, and mechanism for contracting each pocket to grasp the bag when it is drawn into it, and prevent its displacement by the return movement of the upper plunger.

3. In a package filling machine the combination of a series of bag-holding pockets constructed to be expanded and contracted, a chute for delivering charges of material into the pockets successively, and a mechanism for contracting each pocket before the charge of material is delivered into it, whereby the pocket closely grasps and supports the bag and protects it against distension by the dumping of the material into it.

4. In a package filling machine the combination of a series of bag-holding pockets constructed to be expanded and contracted, a former and plungers for carrying a bag from said former into a pocket, driving mechanism for moving the pockets to bring them successively to the bag-receiving position, a chute for delivering charges of material into the bags held in said pockets successively, and a mechanism for contracting the successive pockets constructed to act on each pocket to contract it after the bag has been placed in it and before the charge of material is dumped into it, whereby during the dumping in of the material the bag is closely grasped and supported by the pocket.

5. In a package filling machine the combination of a series of bag-holding pockets constructed to be expanded and contracted, a chute for delivering charges of material into the pockets successively, and a mechanism for contracting each pocket before the charge of material is delivered into it, with an agitating mechanism for shaking down the contents of the packages successively, and a mechanism for expanding the successive pockets prior to the operation of the agitating mechanism.

6. In a packaging machine the combination of a series of bag holding pockets constructed to be expanded and contracted, mechanism for advancing them successively, means for introducing bags into the pockets successively, an agitating mechanism for alternately lifting and dropping the bags for shaking down or compacting their contents, and a mechanism for contracting each pocket after the bag is placed in it, and for re-expanding it before the operation of the agitating mechanism, whereby the pocket is caused to serve as a loose guide for the bag during its lifting and falling movements while under the action of the agitator.

7. In a packaging machine the combination of a series of bag-holding pockets, constructed to be expanded and contracted, mechanism for advancing them successively, means for introducing bags into the pockets successively, an agitating mechanism for alternately lifting and dropping the bags for shaking down or compacting their contents, and folding and pasting mechanisms for closing the top of the bag, with a mechanism for contracting each pocket after the bag is placed in it and for re-expanding it before the operation of the agitating mechanism, and a mechanism for contracting each pocket before the top of its contained bag is closed and sealed by said folding and pasting mechanisms.

8. In a packaging mechanism the combination of a series of bag-holding pockets constructed to be expanded and contracted, mechanism for advancing them successively, mechanism for contracting the pockets to embrace their contained bags, a plunger for expelling the completed packages from the successive pockets, and a mechanism for expanding each pocket before the operation of said plunger.

9. In a packaging machine the combination of a series of bag-holding pockets, constructed to be expanded and contracted, with mechanism for contracting them to embrace the contained bags, and an adjusting device adapted to determine the extent of contraction of the pockets by said contracting mechanism.

10. In a packaging machine, the combination of a series of bag-holding pockets, constructed to be expanded and contracted, and folding and pasting mechanisms for closing the top of the bags, with mechanism for contracting each pocket before the top of its contained bag is closed and sealed by said folding and pasting mechanisms, and an adjusting device adapted to determine the extent of contraction of the pockets by said contracting mechanism.

11. In a packaging machine, the combination of a series of bag-holding pockets, constructed to be expanded and contracted, with mechanism for contracting them to embrace the contained bags, consisting of an arm (as M) acting against one section of the pocket to thrust it toward the opposite section, a cam (as M') connected to and operating said arm, and an adjusting screw (as m) interposed in the connection between said cam and arm, and adapted to adjust at will the extent of thrust imparted by said arm to the pocket, and thereby to limit the contraction of the pocket against its inclosed bag.

12. In a packaging mechanism the combination of a series of bag-holding pockets constructed to be expanded and contracted, mechanism for advancing them successively, mechanism for contracting the pockets to embrace their contained bags, and a mechanism for expanding the pockets consisting of a pusher located exterior to the pockets at the position where the pockets are to be expanded, and mounted to be movable toward and from the pocket, a cam for reciprocating said pusher, and intervening connections for communicating the thrust of said cam to the pusher.

13. In a packaging mechanism the combination of a series of bag-holding pockets constructed each with a movable wall whereby the pocket may be expanded or contracted, and a projecting rod connected to said movable wall, whereby when pushed in the wall is displaced to expand the pocket, with a mechanism for expanding the pocket consisting of a pusher movable against said rod to thrust it in, and a driving mechanism for reciprocating said pusher.

14. The combination of a pocket E having a movable wall E' and sliding rods e' e' connected thereto and mounted to protrude at their ends beyond their supports, with a pusher as J' mounted to act against the ends of said rods to thrust them back and displace said movable wall to expand the pocket.

15. The combination of a circular series of bag-holding pockets, a carrying wheel to which they are fastened, having bolt-notches corresponding in number and spacing to the pockets, and a driving mechanism for intermittently advancing the pockets, consisting of a bolt constructed to advance and enter a notch, to oscillate forward carrying the wheel with it the distance from one pocket to the next, to thereupon retract out of the notch, and finally to swing freely back into position to enter the next notch, and cams for imparting these movements to said bolt.

16. The combination of pockets E E, carrying wheel D therefor, having bolt-notches d d, vibratory lever F, bolt F¹ carried thereby and movable longitudinally thereof, cam f' for imparting intermittent oscillations to said lever, and cam f for intermittently protruding said bolt into one of said notches, and retracting it clear thereof.

17. The combination of a series of pockets, constructed to be expanded and contracted, a carrying wheel to which said pockets are fastened, having bolt notches, a driving mechanism for intermittently advancing said wheel, comprising a bolt, a cam for protruding it into engagement with said notches successively, and retracting it, and a cam for swinging the bolt forward while engaged with a notch and backward while disengaged, and a mechanism for expanding the pockets consisting of a pusher movable against the successive pockets to expand them, and connected to the mechanism which actuates said bolt so as to be moved forward to expand the pocket by the movement which retracts the bolt.

18. In a packaging machine the combination of a series of bag-holding pockets, a driving mechanism for intermittently advancing them the distance from one pocket to the next, and means for holding the pockets fixedly in correct position during their periods of rest, consisting of a moving part mounted to advance into direct engagement with the exterior of the successive pockets and to retract out of the way of the movement thereof, and mechanism for imparting these movements to said part between the successive advancing movements of said driving mechanism.

19. In a packaging machine the combination of a series of bag-holding pockets, a driving mechanism for intermittently advancing them the distance from one pocket to the next, and means for centering the pockets and holding them fixedly in correct position during their periods of rest, consisting of arms movable forward to embrace a pocket between them, and backward to clear the pocket, and a cam for imparting these movements thereto.

20. In a packaging machine the combination of a series of bag-holding pockets, a driving mechanism for intermittently advancing them the distance from one pocket to the next, and means for centering the pockets and holding them fixedly in correct position during their periods of rest, consisting of two opposite arms S S connected together and movable toward a pocket to bear against opposite sides thereof, and thereby to draw it into correct position, and a cam S³ for moving said arms toward and from the pockets.

21. In a packaging machine the combination with a series of bag-holding pockets, a plunger movable up through the pockets in succession to lift the packages out therefrom, and a delivery belt, of a delivering device for transferring the packages from said plunger onto said belt, consisting of a pusher-plate R fixed on a pivoted lever-arm R', and a cam-movement for oscillating said arm at intervals, whereby said plate pushes each package from the top of the plunger, turns it partly around, and directs it onto the delivery belt.

H. E. SMYSER.

Witnesses:
LISLE STOKES,
FRANCIS T. CHAMBERS.